United States Patent [19]

DiCastri

[11] Patent Number: 4,529,379
[45] Date of Patent: Jul. 16, 1985

[54] COOKING APPARATUS

[76] Inventor: Peter DiCastri, 7119 N. Western Ave., Chicago, Ill. 60645

[21] Appl. No.: 536,629

[22] Filed: Sep. 28, 1983

[51] Int. Cl.³ .............................................. F27G 9/00
[52] U.S. Cl. .................................... 432/148; 432/59; 432/146; 432/147
[58] Field of Search .................... 432/8, 59, 133, 136, 432/143–146, 148, 152, 159, 176, 189, 194, 196, 209

[56] References Cited

U.S. PATENT DOCUMENTS

| | | | |
|---|---|---|---|
| 2,908,234 | 10/1959 | Naylor | 432/145 |
| 2,949,869 | 8/1960 | Leeuwrik | 432/148 |
| 3,801,267 | 4/1974 | Okuno et al. | 432/133 |

FOREIGN PATENT DOCUMENTS 16731  9/1967  Japan ................................. 432/136

Primary Examiner—Henry C. Yuen
Assistant Examiner—John Kwon

[57] ABSTRACT

A cooking oven utilizing in combination, convection, radiant, and pregnation heating. The apparatus includes a cooking compartment positioned between combustion chambers that provide spaced apart confronting heating surfaces which provide radiant heating, and forced circulating heating air passages, each of which have an inlet opening with a closed heated plenum chamber so as to forcibly discharge pregnating heat therethrough into the cooking compartment, with the heated air contained in the cooking chamber providing normal convection heating therein.

8 Claims, 4 Drawing Figures

COOKING APPARATUS

SUMMARY OF THE INVENTION

It is an object of this invention to provide a cooking apparatus capable of crisping, browning, and searing a food product by a combination of heat transfer methods.

Forced convection type cookers have heretofore been devised which have been found incapable of providing controlled transfer of heat to the interior and surface of food products to accomplish the full scope of cooking requirements. Apparatus of the known forced convection type cookery generally provide insufficient external heating to the product within the time required for cooking internal portions. Further limitations of the standard known cooking apparatuses result in burning low heat sink areas before properly finishing high heat sink areas, resulting in undesired prepared food products.

This invention by its particular combustion affords a combination of convection, radiant and pregnation heating of food products. The combination of cooking methods results from providing a cooking compartment positioned between closed combustion chambers that provide spaced apart confronting heated surfaces from which heat radiates. The apparatus provides a circulation of heated air into the full cooking compartment for normal convection type cooking. In association with the cooking compartment there is a closed heated plenum chamber that provides a plurality of heated air jets which, when their outlet port is in close proximity to the food product to be cooked, provides pregnating heating of the same.

Other objects of the invention will hereinafter be made apparent.

BRIEF DESCRIPTION OF THE DRAWINGS

The invention will be best understood by reference to the accompanying drawings which disclose the preferred mode of construction by which the stated objects are achieved, and, in which.

GENERAL DESCRIPTION

Figure 1:
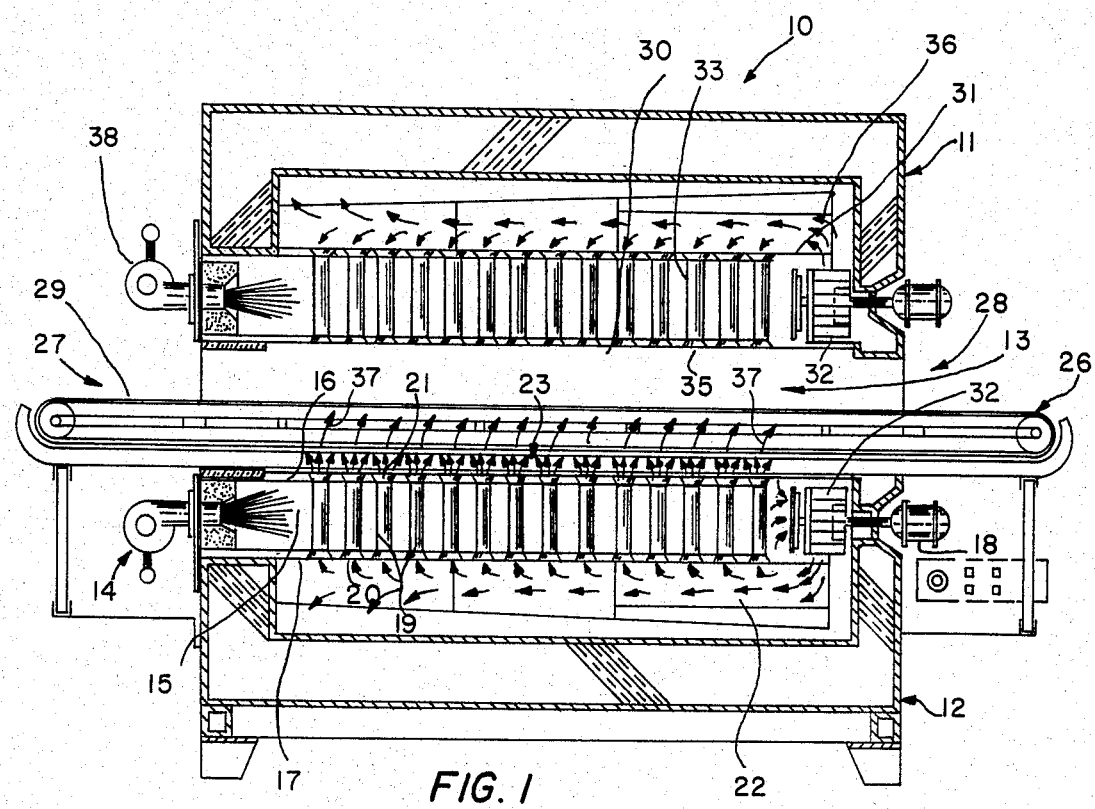
FIG. 1 is a side elevational sectional detailed view of the cooking apparatus of this invention.
Figure 2:
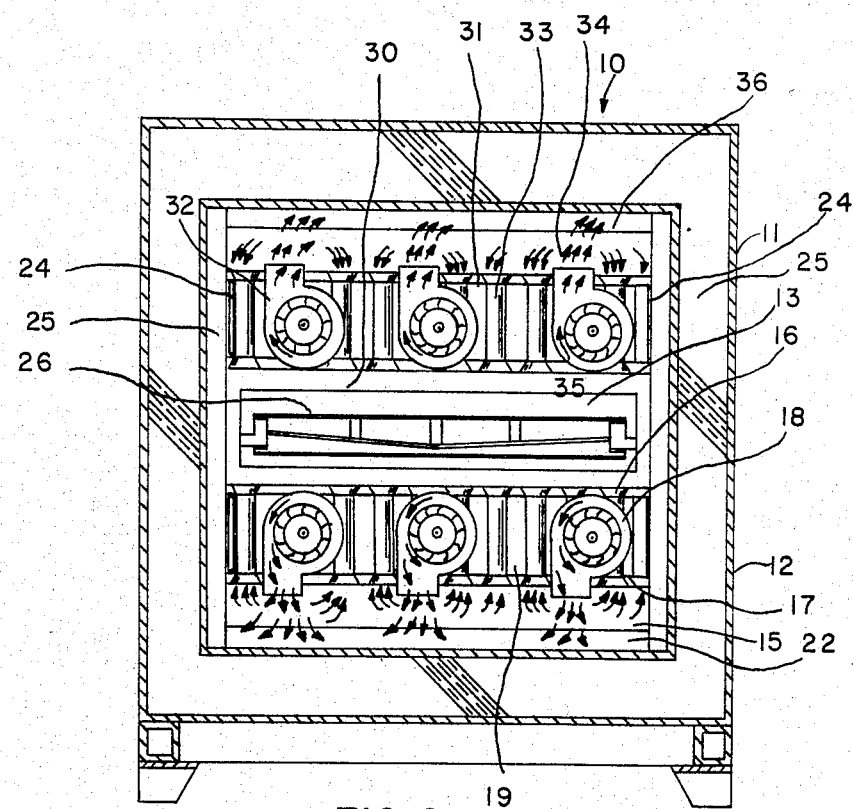
FIG. 2 is an end elevational sectional detailed view of the invention.
Figure 3:
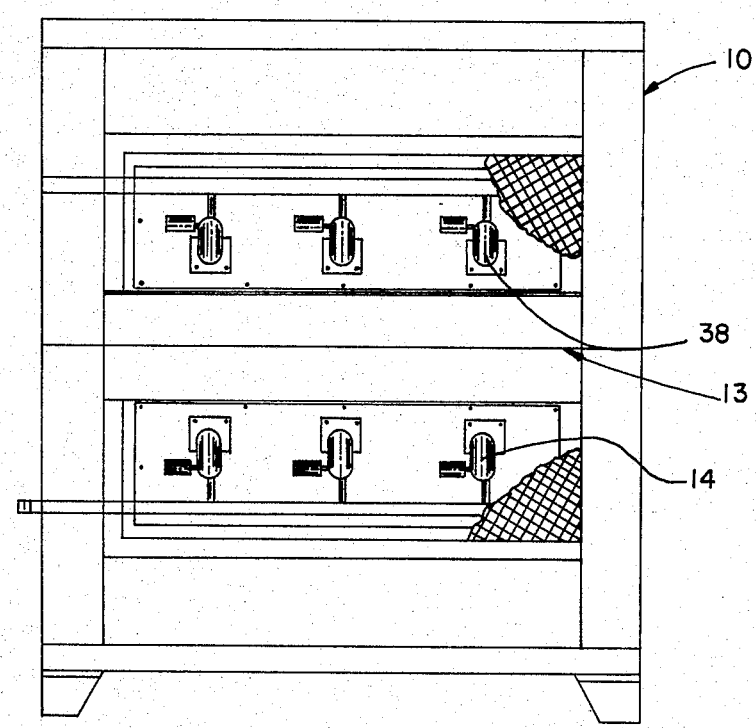
FIG. 3 is an end elevational view of the invention.

The cooking apparatus of this invention as illustrated in the drawings consists of a cooking oven 10 which comprises an upper section 11 and a lower section 12. Each of the sections 11 and 12 of the oven are substantially identical in construction and operation and fully cooperate in achieving the stated objects of the invention. For the purpose of explanation I will first fully describe the structure as contained in the lower section 12.

As illustrated in FIG. 1, the lower section 12 consists of a suitable heat source 14 which, as shown, is a gas burner. The heat source 14 has communication with a combustion chamber 15 which consists of a top plate 16 and a bottom wall 17. At the far end of the combustion chamber 15 is an air circulating means 18.

Interposed between the top plate 16 and the bottom wall 17 are a series of tubes 19 which have an inlet port 20 extending through the bottom wall 17 and an outlet port 21 extending through the top plate 16, thus providing open communication with the cooking compartment 13.

The air circulating means 18 is adapted to draw the heated air through the combustion chamber 15 for recirculation through a closed plenum 22. The heated forced air passing into the closed plenum 22 will find exhaust paths through the open tubes 19 thus providing forced jets of air 23 into the cooking compartment 13.

Figure 4:
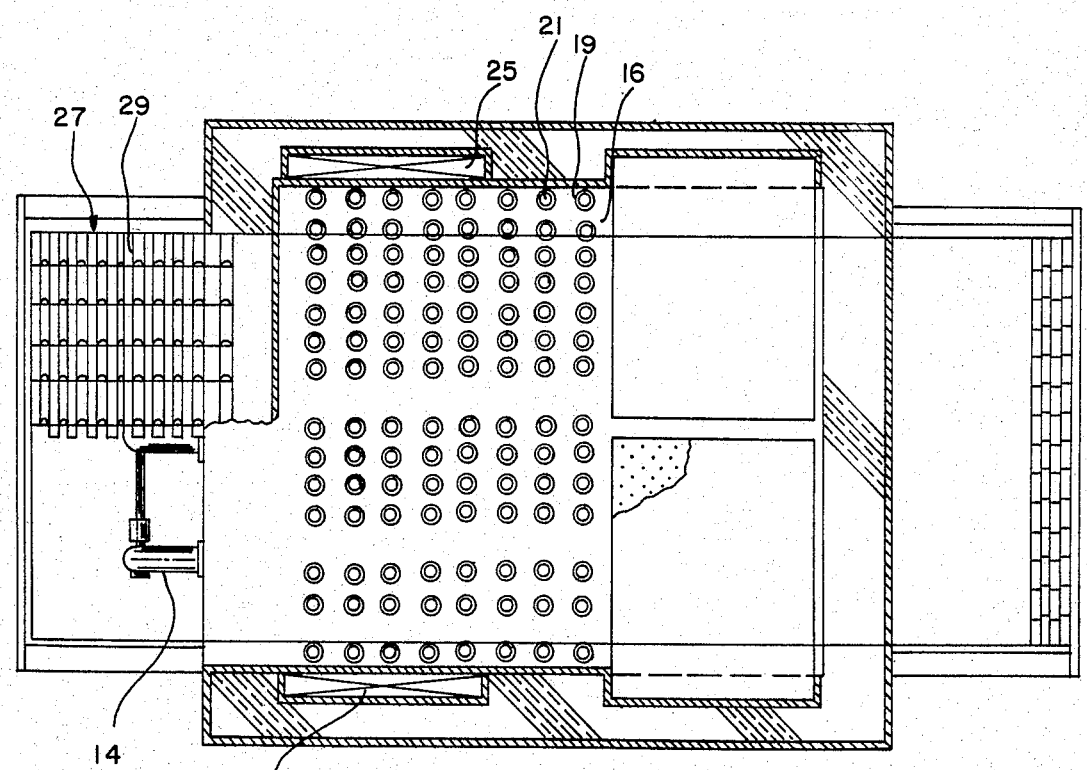
FIG. 4 is a top plan sectional detailed view of the invention.

As illustrated in FIG. 4, a portion of the side walls 24 of the apparatus 10 are formed to provide ducts 25 by which the heated air introduced into the cooking compartment 13 may be suitably exhausted out of the apparatus 10 during the operation thereof.

Extending between the upper section 11 and the lower section 12 is a conveyor system 26 which provides an entrance 27 and an exit 28 for the cooking compartment 13. The conveyor system 26 provides an open mesh conveyor belt 29, as shown in FIG. 4, through which the forced jet air 23 may be impinged upon a food product supported upon the belt 29 as it progressively moves through the cooking compartment 13.

The upper section 11 also provides a top plate 30 and bottom wall 31 as well as an air circulating means 32. There is likewise provided a series of tubes 33 having inlet ports 34 and outlet ports 35 formed in the top plates 30 and bottom wall 31 and having communication with a closed plenum 36. The air circulating means 32 also forcing the air through the tubes 33 so as to provide streams of forced jet air 37 into the cooking compartment 13.

By this arrangement the heat source 14 and 38 for the upper and lower sections 11 and 12, respectively, of the apparatus 10 will heat their respective top plates 16 and 30 which define the cooking compartment 13 to thus provide radiant heating to the food product to be cooked as it passes through the cooking compartment 13 onto the conveyor system 26. Simultaneously the heated air from the heat sources 14 and 38 will heat the tubes 19 and 33. The heated air circulated by the air circulating means 18 and 32 will be forced into the closed plenums 22 and 36 creating a pressure difference therein thus effecting jets of air 23 and 37 through the tubes 19 and 33 into the cooking compartment 13. When the food product to be cooked is positioned between confronting tube outlets 21 and 35 the forced jet air 23 and 37 will be impinged upon the product thus creating a pregnating cooking heat to such product.

As the jets of heated air 23 and 37 are contained and circulate within the cooking compartment 13 they will heat the same and produce a normal convection type cooking heat upon the food product as it is passed through the cooking compartment 13.

While the preferred mode of construction as heretofore described and illustrated indicates the heat source 14 as comprising a gas burner, it should be noted that without departing from the structure and function alternate heat sources such as electricity or radiation may be employed without effecting the scope of this invention.

In addition it is also noted that the preferred mode of construction provides for a conveyor system 26 for moving a food product through the cooking compartment 13 and it should be understood that within the scope of this functional structure a rotisserie or other types of food product moving apparatuses can be employed without departing from the scope of the invention.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described the invention, what I claim as new and desire to secure by Letters Patent is:

1. An apparatus for cooking a food product by convection, radiant and pregnating heating, including a cabinet like member providing a cooking compartment extending therethrough, and a product supporting and moving means in the cooking compartment, comprising;
   (a) elongated combustion chambers closed to the cooking compartment and formed by heat transfer plates extending the length of the cooking chamber and forming top and bottom walls thereof for heating the cooking chamber by radiant heat,
   (b) a heat source for each of said combustion chambers at one end thereof and air moving means in communication with said combustion chambers at the opposite end thereof,
   (c) plenums spaced from the cooking chamber by each of said combustion chambers and having communication with the combustion chamber through said opposite end thereof so as to receive the heated air moved therethrough by said air moving means, and
   (d) means providing closed restricted passageways through said combustion chambers between said plenums and said cooking compartment for directly impregnating heated cooking medium into the cooking compartment throughout its length wherein said means providing restricted passageways between said plenums and said cooking compartment comprise a series of tubular members having open communication at one end with said plenums and at the other end with said cooking compartment and extending in a closed condition through said combustion chambers.

2. An apparatus for cooking a food product as defined by claim 1, wherein said air moving means comprises a fan having receiving communication with said combustion chamber and exhaust communication with said plenum.

3. An apparatus for cooking a food product as defined by claim 1, wherein said air moving means comprises a fan having receiving communication with said combustion chamber and exhaust communication with said plenum.

4. An apparatus for cooking a food product as defined by claim 1, wherein said air moving means comprises a fan having receiving communication with said combustion chamber and exhaust communication with said plenum.

5. An apparatus for cooking a food product as defined by claim 1, wherein said means providing restricted passageways between said plenums and said cooking compartment comprise a series of tubular members having open communication at one end with said plenums and at the other end with said cooking compartment and extending in a closed condition through said combustion chambers.

6. An apparatus for cooking a food product as defined by claim 1, wherein said product supporting and moving means comprises a conveyor system including a continuous open mesh belt movable through said cooking compartment and between said heat transfer means.

7. An apparatus for cooking a food product as defined by claim 6, wherein said air moving means comprises a fan having receiving communication with said combustion chamber and exhaust communication with said plenum.

8. An apparatus for cooking a food product as defined by claim 6, wherein said means providing restricted passageways between said plenums and said cooking compartment comprise a series of tubular members having open communication at one end with said plenums and at the other end with said cooking compartment and extending in a closed condition through said combustion chambers.

* * * * *